Patented Aug. 21, 1951

2,564,679

UNITED STATES PATENT OFFICE 2,564,679

INSECT REPELLENTS

Nathan L. Drake, College Heights, Md., and Warren E. Weaver, Washington, D. C., assignors to the United States of America as represented by the Secretary of the Army No Drawing. Application January 11, 1949,
Serial No. 70,385

4 Claims. (Cl. 167—33)

This invention relates to insect repellents.

We have found that the application of the tetrahydrofurfuryl ester of 1-acetoxy cyclopentanecarboxylic acid, a compound having a structural formula

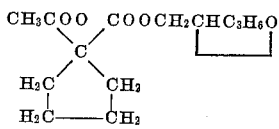

to the human skin or to a fabric affords effective protection against insect bites, by repelling insects, particularly Aedes aegypti and Anopheles quadrimaculatus.

A number of tests to measure the repellency of the tetrahydrofurfuryl ester of 1-acetoxy cyclopentanecarboxylic acid against Aedes aegypti was conducted by smearing the compound on the arms of test personnel, who then thrust their arms into cages containing Aedes aegypti. The arms were exposed for 30-minute intervals at 3 minutes each until the first insect bite.

Tests to measure the repellency of fabrics against Aedes aegypti were conducted by uniformly impregnating mercerized cotton hose with the compound at a rate equivalent to 3.3 gms. per sq. ft., drawing the dried hose over the arms of test personnel, who then thrust their covered arms into cages containing Aedes aegypti for 1 to 2 minutes. If no bites or less than 5 bites were received, the tests were repeated each successive day until 5 or more bites during one exposure were received.

It was found that the application of the tetrahydrofurfuryl ester of 1-acetoxy cyclopentanecarboxylic acid affords protection against Aedes aegypti for an average of 304 minutes. Against Anopheles quadrimaculatus, an average repellency time of 47 minutes was noted in analogous tests.

It was found that fabric impregnated with the tetrahydrofurfuryl ester of 1-acetoxy cyclopentanecarboxylic acid remained repellent to Aedes aegypti for over 10 successive days.

The tetrahydrofurfuryl ester of 1-acetoxy cyclopentanecarboxylic acid may be prepared by acetylating the tetrahydrofurfuryl ester of 1-hydroxy cyclopentanecarboxylic acid, as follows:

38.5 gms. of the tetrahydrofurfuryl ester of 1-hydroxy cyclopentanecarboxylic acid are placed in a 300 ml. three-necked flask with 40 cc. of dry pyridine and cooled to −5° C. 28.2 gms. of acetyl chloride dissolved in 40 cc. of dry benzene are slowly added with stirring over a period of two hours, and stirring is continued for another hour. The product of the reaction is successively washed with water, sulfuric acid, sodium carbonate and salt solution, and finally is distilled. The yield is 32 gms. of the tetrahydrofurfuryl ester of 1-acetoxy cyclopentanecarboxylic acid, a colorless water-insoluble, alcohol-soluble liquid, boiling at 126–128° C. at .5 mm. pressure, and having a refractive index of $n_D^{20}=1.4662$.

For ease of application to the skin, the tetrahydrofurfuryl ester of 1-acetoxy cyclopentanecarboxylic acid may be incorporated in a suitable inert liquid or solid carrier such as mineral oil, alcohol, petrolatum, etc. For ease and uniformity of application to the fabric, the tetrahydrofurfuryl ester of 1-acetoxy cyclopentanecarboxylic acid may be applied to the fabric in an inert solvent, such as alcohol, ether, etc.

Having thus described our invention, we claim:

1. An insect repellent fabric comprising fabric impregnated with the tetrahydrofurfuryl ester of 1-acetoxy cyclopentanecarboxylic acid.

2. An insect repellent composition comprising tetrahydrofurfuryl ester of 1-acetoxy cyclopentanecarboxylic acid in a non-gaseous inert organic carrier.

3. The tetrahydrofurfuryl ester of 1-acetoxy cyclopentanecarboxylic acid.

4. A process of repelling insects comprising applying the tetrahydrofurfuryl ester of 1-acetoxy cyclopentanecarboxylic acid to the region from which the insects are to be repelled.

NATHAN L. DRAKE.
WARREN E. WEAVER.

REFERENCES CITED

The following references are of record in the file of this patent:

UNITED STATES PATENTS

| Number | Name | Date |
|---|---|---|
| 2,400,006 | Jones et al. | May 7, 1946 |

OTHER REFERENCES

OSRD Bimonthly Progress Report No. 22, section 1, Feb. 28, 1945, particularly page 13, 0-6138, cyclohexyl ester of cyclopentane-1-ol-1-carboxylic acid.

OSRD Bimonthly Progress Report No. 24, section 1, June 30, 1945, particularly page 2, 0-6500, cyclopentane carboxylic acid, 1-hydroxy-, 2-butoxy ethyl ester.

OSRD Interim Report No. 0-87, (previously cited), particularly page 104, 0-6139, cyclopentane-1-ol-1-carboxylic acid, cyclopentyl ester.

OSRD Insect Control Committee Report No. 16, Interim Report No. 0-87 Feb. 1, 1945.